(12) United States Patent
Li (10) Patent No.: US 12,407,474 B2
(45) Date of Patent: Sep. 2, 2025

(54) DATA TRANSMISSION METHOD AND DATA TRANSMISSION APPARATUS

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 363 days.

(21) Appl. No.: 17/799,646

(22) PCT Filed: Feb. 14, 2020

(86) PCT No.: PCT/CN2020/075404
§ 371 (c)(1),
(2) Date: Aug. 12, 2022

(87) PCT Pub. No.: WO2021/159515
PCT Pub. Date: Aug. 19, 2021

(65) Prior Publication Data
US 2023/0081293 A1    Mar. 16, 2023

(51) Int. Cl.
*H04L 5/00* (2006.01)
*H04W 72/044* (2023.01)
*H04W 72/23* (2023.01)

(52) U.S. Cl.
CPC ......... *H04L 5/0053* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0182807 A1 | 6/2019 | Panteleev et al. | |
| 2020/0045700 A1 | 2/2020 | Sun et al. | |
| 2020/0128516 A1* | 4/2020 | Zhang | H04L 5/0053 |
| 2020/0170000 A1 | 5/2020 | Hang et al. | |
| 2020/0187172 A1 | 6/2020 | Wang et al. | |
| 2020/0260416 A1* | 8/2020 | Kim | H04B 7/088 |
| 2021/0243659 A1* | 8/2021 | Cirik | H04L 5/0048 |

(Continued)

FOREIGN PATENT DOCUMENTS

| | | |
|---|---|---|
| CN | 109150445 A | 1/2019 |
| CN | 109391294 A | 2/2019 |
| WO | 2018141246 A1 | 8/2018 |

OTHER PUBLICATIONS

Extended European Search Report issued in Application No. 20918556.0, dated Feb. 8, 2023,(11p).

(Continued)

*Primary Examiner* — Huy D Vu
*Assistant Examiner* — Bao G Nguyen
(74) *Attorney, Agent, or Firm* — Arch & Lake LLP (57) ABSTRACT

A data transmission method is provided. The data transmission method is performed by a network device and includes: configuring a plurality of different frequency domain resources, and configuring a same time domain resource for the plurality of different frequency domain resources; and sending a same downlink control signaling on a plurality of beams, using the same time domain resource with the plurality of different frequency domain resources.

14 Claims, 4 Drawing Sheets

(56) References Cited

U.S. PATENT DOCUMENTS

2022/0225330 A1* 7/2022 Xu .................. H04L 5/0053
2022/0394638 A1* 12/2022 Yang ................ H04W 56/001

OTHER PUBLICATIONS

Lenovo, et al., "Discussion of multi-TRP/panel transmission" 3GPP TSG-RAN WG1 #96, R1-1902161, Athens, 2 Greece, Feb. 25-Mar. 1, 2019, (10p).

Oppo, "Enhancements on multi-TRP and multi-panel transmission", 3GPP TSG RAN WG1 Meeting #98, R1-1908351, 3 Prague, CZ, Aug. 26-30, 2019, (13p).

Huawei, et al., "Enhancements on multi-TRP/panel transmission", 3GPP TSG RAN WG1 Meeting #95, R1-1812243, 4 Spokane, USA, Nov. 12-16, 2018, (9p).

OA for JP application 2022-548523 dated Aug. 1, 2023 with English translation, 19 pages.

Ericsson, "Enhancements on Multi-beam Operation", 3GPP TSG-RAN WG1 Meeting 94bis, Tdoc R1-1811188, Chengdu, China, Oct. 8-12, 2018, 18 pages.

Catt, "Consideration on multi-TRP /panel transmission", 3GPP TSG-RAN WG1 94bis, R1-1904561, Apr. 12, 2019, Xi'an, China, 15 pages.

Qualcomm Inc., "Multi-TRP Enhancements", 3GPP TSG-RAN WG1 Meeting 99#, R1-1912967, Nov. 18-22, 2019, Reno, Nevada, USA, 22 pages.

Huawei, Hisilicon, "Summary of AI7.2.8.2 Enhancements on Multi-TRP/Panel Transmission of Offline Discussion", 3GPP TSG-RAN WG1 Ad-Hoc Meeting 1901, R1-1901371, Jan. 21-25, 2019, Taipei, 6 pages.

Sony, "Consideration on multi-TRP /panel transmission", 3GPP TSG-RAN WG1 Meeting #99, R1-1912355, 2019, Nov. 18-22, 2019, Reno, Nevada, USA, 5 pages.

International Search Report of PCT/CN2020/075404 dated Nov. 18, 2020 with English translation, (4p).

Fujitsu, "Ambiguities about beam indication and aperiodic CSI-RS Triggering offset configuration in some cases", 3GPP TSG RAN WG1 Meeting #92, R1-1801892, Athens, Greece, Feb. 26-Mar. 2, 2018, (9p).

The KROA issued in KR Application No. 10-2022-7031497 dated Feb. 5, 2025 with English translation, (11p).

Vivo, "Further Discussion on Multi-TRP Transmission," 3GPP TSG RAN WG1 #96bis, R1-1904096, Xi'an, China, Apr. 8-12, 2019, (14p).

Huawei, HiSilicon, "Summary of Enhancements on Multi-TRP/Panel Transmission," 3GPP TSG RAN WG1 Meeting #98, R1-1909602, Prague, Czech Republic, Aug. 26-30, 2019, (76p).

* cited by examiner

DATA TRANSMISSION METHOD AND DATA TRANSMISSION APPARATUS

CROSS-REFERENCE TO RELATED APPLICATION

This application is the U.S. national phase of International Application No. PCT/CN2020/075404, filed on Feb. 14, 2020, the entire contents of which are incorporated herein by reference for all purposes.

TECHNICAL FIELD

The disclosure relates to a field of communication technologies, and particularly to a data transmission method and a data transmission apparatus.

BACKGROUND

In the new radio (NR) technology, in order to ensure a coverage area and resist a path loss, data transmission is typically performed based on a beam.

During the data transmission based on a beam, a network device (such as a base station) indicates a transmission configuration indication (TCI) state or spatial relation information through signalings, so as to indicate a receiving beam or transmitting beam of a terminal. Each TCI state or spatial relation information corresponds to a reference signal (RS), the RS may be a non-zero power channel state information reference signal (CSI-RS), or may be a synchronization signal block (SSB), or may also be a sounding reference signal (SRS). Thus, the terminal may be informed of the receiving beam used for receiving a physical downlink control channel (PDCCH) through the TCI state or spatial relation information.

SUMMARY

In order to solve problems in the related art, the disclosure provides a data transmission method and a data transmission apparatus.

According to a first aspect of the disclosure, a data transmission method is provided. The method is applied in a network device and includes: configuring a plurality of different frequency domain resources, and configuring a same time domain resource for the plurality of different frequency domain resources; and sending a same downlink control signaling on a plurality of beams, using the same time domain resource with the plurality of different frequency domain resources.

According to a second aspect of the disclosure, a data transmission method is provided. The method is applied in a terminal and includes: determining a plurality of different frequency domain resources and a same time domain resource configured for the plurality of different frequency domain resources; and receiving a same downlink control signaling on a plurality of beams, using the same time domain resource with the plurality of different frequency domain resources.

According to a third aspect of the disclosure, a data transmission device is provided. The device includes a processor and a memory configured to store instructions executable by the processor. The processor is configured to perform acts including: configuring a plurality of frequency transmission resources, and configuring a same time domain resource for the plurality of different frequency domain resources; and sending a same downlink control signaling on a plurality of beams, using the same time domain resource with the plurality of different frequency domain resources.

According to a fourth aspect of the disclosure, a data transmission device is provided. The device includes a processor and a memory configured to store instructions executable by the processor. The processor is configured to perform the data transmission method according to the second aspect.

It should be understood that, the above general descriptions and latter detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Figure 1:
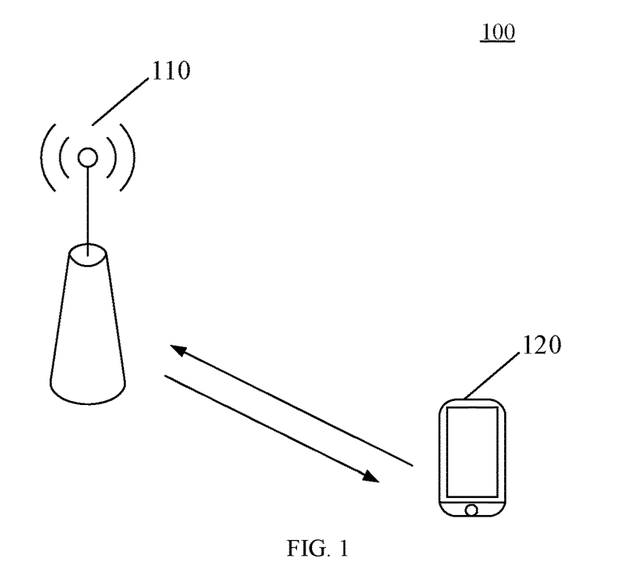
FIG. 1 is a schematic diagram illustrating a communication system according to an embodiment.

The disclosure provides a data transmission method, which may be applied in a wireless communication system illustrated in FIG. 1. As illustrated in FIG. 1, the wireless communication system 100 includes a network device 110 and a terminal 120. The terminal is connected to the network device 110 via radio resources for data transmissions.

It should be understood that the wireless communication system 100 illustrated in FIG. 1 is merely an example, the wireless communication system 100 may further include other network devices, for example may further include a core network device, a wireless repeater, a wireless backhaul device and so on, which are not shown in FIG. 1. The number of network devices and the number of terminals included in the wireless communication system are not limited in the embodiments of the disclosure.

It should be understood that the wireless communication system is a network providing a wireless communication function. The wireless communication system may adopt different communication technologies, for example code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to factors of different networks, such as capacities, rates and time latencies, the networks can be classified to a 2G (the second generation) network, a 3G network, a 4G network or a future evolution network, such as a 5G network. The 5G network may be also referred to as a new radio (NR) network. For convenience of description, the wireless communication network may be called as network.

Further, the network device 110 in the disclosure may be also called as wireless network device. The wireless network device may be a base station, an evolved node base station, a home base station, an access point (AP) in a wireless fidelity (WIFI) system, a wireless repeater node, a wireless backhaul node, a transmission point (TP), a transmission and reception point (TRP) and so on. The wireless network device may also be a gNB in the NR system, or components or a part of devices consisting the base station. It should be understood that, the network device may provide coverage for a specific geographical region, and communicate with terminals within the coverage area (cell). Further, in a video to everything (V2X) communication system, the wireless network may also be a vehicle-mounted device.

Further, the terminal 120 in the disclosure may also be called as terminal device, user equipment (UE), mobile station (MS), mobile terminal (MT) or the like, is a device providing speech and/or data connectivity to users. For example, the terminal may be a handhold device, a vehicle mounted device having a wireless connection function. At present, the terminal may be, for example, a mobile phone, a pocket personal computer (PC), a palmtop, a personal digital assistant (PDA), a notebook computer, a tablet computer, a wearable device, a vehicle-mounted device or the like. Further, in the V2X communication system, the terminal device may also be a vehicle-mounted device. It should be understood that, the specific technology and form of the terminal is not limited in the embodiments of the disclosure.

The network 110 and the terminal 120 perform the data transmission based on a beam in the disclosure. During the data transmission based on the beam, the network device (such as a base station) indicates a transmission configuration indication (TCI) state or spatial relation information through signalings, so as to indicate a receiving beam or transmitting beam of the terminal. At present, the network device uses one panel to send a PDCCH to a user. For the TCI state of the PDCCH, a radio resource control (RRC) signaling is used to configure one TCI state list for each control resource set (CORESET), the list includes multiple (for example 64) TCI states, and then a media access control (MAC) signaling is used to activate one of the multiple TCI states configured by the RRC signaling for each CORESET. When the network device sends the PDCCH to the terminal, the terminal uses the receiving beam of the reference signal corresponding to the TCI state activated by the MAC signaling to receive the PDCCH. In the related art, for one PDCCH, the network device only configures one TCI state for the terminal.

When the network device has multiple transmission reception points (TRPs) and each TRP has one or more transmitting panels, or when the network device has one TRP but the TRP has multiple transmitting panels, the network device can use multiple panels (the multiple panels may come from the same TRP or different TRPs) to send the PDCCH to the same terminal simultaneously. In this case, different panels have different beam transmitting directions, and the terminal needs to use different panels to receive the PDCCH. The network device needs to indicate different TCI states to the user terminal, and each TCI state corresponds to one beam direction of each panel of the terminal. For the CORESET for sending the PDCCH, the MAC signaling merely activates one TCI state of the multiple TCI states configured by the RRC signaling for each CORESET, so that the terminal uses the activated TCI state to determine the receiving beam when receiving the PDUCCH transmitting on the CORESET, thus leading to a poor reliability.

When the signaling provides the TCI state indicator of type D, to instruct the terminal to use the receiving beam used for receiving the RS corresponding to the TCI state indicator when receiving the PDCCH (as shown in Table 1).

TABLE 1

| TCI state | RS index | remark |
| --- | --- | --- |
| TCI#0 | SSB index#1 | If the network device informs the terminal of TCI#0, it indicates that the network device indicates the terminal to use the best receiving beam for receiving SSB index#1 to receive the PDCCH. |
| TCI#1 | SSB index#2 | |
| TCI#2 | CSI-RS index#5 | |
| TCI#3 | CSI-RS index#6 | |
| ... | | |

In the relate art, when the network device configures the CORESET for the terminal, a CORESET pool index can be configured. The CORESETs from the same TRP/panel correspond to the same CORESET pool index. The network device may further configure a CORESET identification (CORESET ID), a time domain position (in the time domain, only the number of symbols is configured, a starting symbol position is determined by a search space) and a frequency domain position occupied by the CORESET, and the TCI state activated by the MAC signaling (i.e., a beam direction of a spatial domain resource) for the terminal.

However, in the related art, with the method of sending the downlink control signaling on one beam direction, the data transmission may have a poor reliability.

Accordingly, the embodiments of the disclosure provide a data transmission method. With the data transmission method, a same downlink control signaling is sent using a same time domain resource on a plurality of beam directions, so as to realize retransmission of the same downlink control signaling (DCI signaling on the PDCCH) on the plurality of beam directions (a plurality of TRP/panels), thus improving a reliability of transmission of the downlink control signaling.

As an implementation, in some embodiments of the disclosure, the same downlink control signaling can be sent using the same time domain resource on the plurality of beam directions with a plurality of different frequency domain resources. As another implementation, in some embodiments of the disclosure, the same downlink control signaling can be sent on the plurality of beam directions with a plurality of transmission resources including the same time domain resource and the same frequency domain resource.

In the embodiments of the disclosure, the method of sending the same downlink control signaling using the same time domain resource on the plurality of beam directions with a plurality of different frequency domain resources is described firstly.

Figure 2:
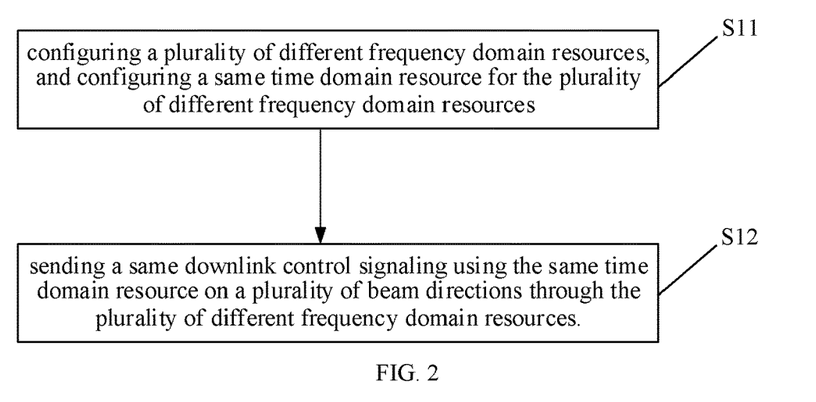
FIG. 2 is a flowchart illustrating a data transmission method according to an embodiment of the disclosure.

FIG. 2 is a flowchart of a data transmission method according to an embodiment. As illustrated in FIG. 2, the data transmission method is applied in a network device and includes the following.

At block S11, a plurality of frequency domain resources are configured, and a same time domain resource is configured for the plurality of frequency domain resources.

At block S12, a same downlink control signaling is sent using the same time domain resource on the plurality of beam directions with the plurality of different frequency domain resources.

In the embodiment, the network device configures the plurality of different frequency domain resources for the terminal, and sends the same downlink control signaling using the same time domain resource on the plurality of beam directions with the plurality of different frequency domain resources, so as to realize retransmission of the downlink control signaling through multiple TRP/panels, thus improving a reliability of transmission of the downlink control signaling.

Figure 3:
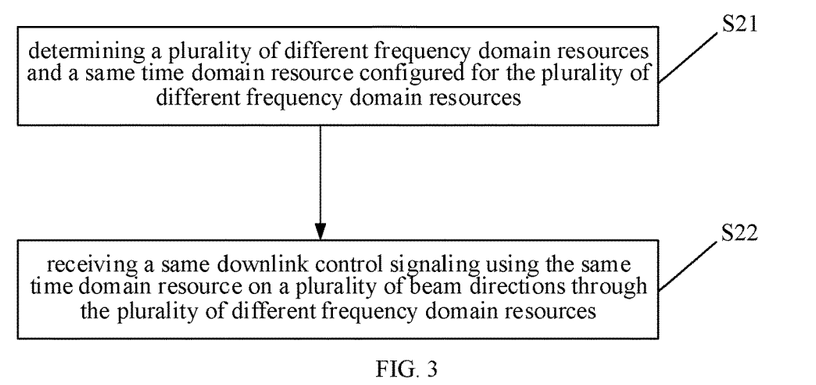
FIG. 3 is a flowchart illustrating a data transmission method according to an embodiment of the disclosure.

FIG. 3 is a flowchart of a data transmission method according to an embodiment. As illustrated in FIG. 3, the data transmission method is applied in a terminal and includes the following.

At block S21, a plurality of frequency domain resources and a same time domain resource configured for the plurality of frequency domain resources are determined.

At block S22, a same downlink control signaling is received using the same time domain resource on the plurality of beam directions with the plurality of different frequency domain resources.

In the embodiment, the terminal determines the plurality of different frequency domain resources configured by the network device for the terminal, and receives the same downlink control signaling using the same time domain resource on the plurality of beam directions with the plurality of different frequency domain resources, so as to realize retransmission of the downlink control signaling through multiple TRP/panels, thus improving a reliability of transmission of the downlink control signaling.

In the embodiments of the disclosure, a method of configuring the plurality of different frequency domain resources involved in the above embodiments will be described in combination of actual applications.

As an implementation, in an embodiment of the disclosure, one CORESET is configured. Frequency domain resources corresponding to the CORESET are assigned to multiple TRP/panels. Different frequency domain resources correspond to different TRP/panels. Different TRP/panels correspond to different beam directions.

In the related art, the CORESET pool index configured for one CORESET may be assigned value 0 or 1, which correspond to TRP/panel #0 and TRP/panel #1, respectively. In other words, the CORESET with the CORESET pool index assigned 0 or 1 corresponds to one TRP/panel, i.e., corresponding to one beam direction. In the embodiments of the disclosure, in order to represent the same CORESET corresponding to different TRP/panels in the embodiments of the disclosure, a new CORESET pool index can be configured for the CORESET corresponding to different TRP/panels. The new CORESET pool index has different values from the existing CORESET pool index. For example, one CORESET is configured, and the CORESET pool index corresponding to the CORESET has a value other than 0 and 1 (for example, when the CORESET pool index with the value of 2 or 3 is configured, it indicates that the CORESET corresponds to multiple TRP/panels).

For ease of description, in the embodiments of the disclosure, the new configured CORESET pool index may be called as first CORESET pool index. The first CORESET pool index is configured to indicate that a plurality of beam directions can be configured for the CORESET. It may be understood that, the CORESET indicated by the first CORESET pool index can be configured for multiple TRP/panels. In the embodiments of the disclosure, the traditional CORESET pool index may be called as second CORESET pool index. The second CORESET pool index is configured to indicate that one beam direction is configured for the CORESET. It may be understood that, the CORESET indicated by the second CORESET pool index can be configured for one TRP/panels.

In the embodiments of the disclosure, in order to assign the frequency domain resources corresponding to one CORESET to multiple TRP/panels, in an implementation, the frequency domain resources corresponding to the same CORESET are divided into multiple different resource block (RB) sets. Different RB sets correspond to different frequency domain resources. Different frequency domain resources correspond to different TRP/panels. Different TRP/panels correspond to different beam directions. In other words, in the embodiments of the disclosure, the plurality of different frequency domain resources for transmitting the same downlink control signaling simultaneously are the multiple RB sets obtained by dividing the frequency domain resources corresponding to the same CORESET.

In the embodiments of the disclosure, RBs in the multiple RB sets obtained by dividing the frequency domain resources corresponding to the same CORESET may be continuous or discontinuous. Each of the multiple RB sets obtained by dividing the frequency domain resources corresponding to the same CORESET may have the same number of RBs. The number of the RB sets obtained by dividing the frequency domain resources corresponding to the same CORESET may be determined based on the number of beam directions in the embodiments of the disclosure. For example, the same downlink control signaling is transmitted on two TRP/panels, TRP/panel #0 and TRP/panel #1, with the number of frequency domain resources, the frequency domain resources corresponding to the same CORESET are divided into two sets, one set is used by TRP/panel #0 while the other set is used by TRP/panel #1. The frequency domain resources corresponding to the same CORESET being divided into two sets may refer to that the frequency domain resources are divided into two sets each of which contains continuous RBs, for example 2N RBs, the RBs numbered with RB #0 to RB #(N−1) are assigned to TRP/panel #0 while the RBs numbered with RB #N to RB #(2N−1) are assigned to TRP/panel #1, or may refer to that the frequency domain resources are divided into two sets each of which contains interweaved and discontinuous RBs, for example 2N RBs, for example 2N RBs, the RBs numbered with RB #0, RB #2, RB #4 . . . RB #(2N−2) are assigned to TRP/panel #0 while the RBs numbered with RB #1, RB #3, RB #5 . . . RB #(2N−1) are assigned to TRP/panel #1.

In the embodiments of the disclosure, the RBs in different RB sets are continuous, so that the plurality of frequency domain resources corresponding to the plurality of beam directions can be divided simply. The RBs in different RB sets are discontinuous, so that a better performance of a frequency domain selection can be obtained.

In another implementation, in some embodiments of the disclosure, in order to assign the frequency domain resources corresponding to one CORESET to multiple TRP/panels, to correspond to the beam directions of the multiple TRP/panels respectively, the frequency domain resources corresponding to the configured CORESET may be assigned to one TRP/panel, while the frequency domain resources of the other TRP/panels may be frequency domain resources obtained by adding a specific offset to the frequency domain resources corresponding to the CORESET. In other words, the plurality of different frequency domain resources have a specific offset with respect to the frequency domain resources corresponding to the CORESET, and the plurality of different frequency domain resources may be the frequency domain resources having the specific offset with respect to the frequency domain resources corresponding to the specific CORESET. For example, there are two TRP/panels, TRP/panel #0 and TRP/panel #1. The frequency domain resources corresponding to the configured CORESET are assigned to TRP/panel #0 (or TRP/panel #1), while the frequency domain resources of the other TRP/panel are the frequency domain resources corresponding to the configured CORESET plus an offset. In the embodiments of the disclosure, the frequency domain resources having the specific offset with respect to the frequency domain resources corresponding to the specific CORESET have the same RB number, just having the offset.

In the embodiments of the disclosure, in the method of configuring one CORESET to realize configuration of the plurality of different frequency domain resources, the CORESET with the same CORESET pool index and the same CORESET ID corresponds to multiple different TRP/panels, i.e., the frequency domain resources of the CORESET on different TRP/panels are the plurality of frequency domain resources by dividing or offsetting the frequency domain resources corresponding to one CORESET with the same CORESET pool index and the same CORESET ID.

In the embodiments of the disclosure, after the CORESET is configured, the TCI states of the plurality of beam directions are indicated based on the RRC signaling and the MAC signaling. Based on the method of configuring one CORESET to realize the configuration of the plurality of different frequency domain resources, for the TCI states, the RRC signaling can indicate a TCI state list of one CORESET, and the MAC signaling activates one or more TCI states in the TCI state list indicated by the RRC signaling.

The plurality of frequency domain resources corresponding to the same CORESET are different. In order to ensure the transmission on the same time domain resource, the plurality of frequency domain resources corresponding to the same CORESET have at least one same configuration parameter. The configuration parameter includes at least one of a number of time domain symbols, a cycle of a search space, a slot offset of the search space, a starting symbol position monitored in a slot of the search space. For example, the plurality of frequency domain resources corresponding to the same CORESET correspond to the same number of time domain symbols. The plurality of frequency domain resources corresponding to the same CORESET correspond to the search space with the same cycle and same slot offset. The plurality of frequency domain resources corresponding to the same CORESET correspond to the same starting symbol position monitored in a slot of the search space.

In the embodiments of the disclosure, in the method of configuring one CORESET to realize the configuration of the plurality of different frequency domain resources, the RRC signaling can jointly configure the TCI states of different TRP/panels corresponding to different frequency domain resources, which may also refer to that one RRC signaling correspondingly configures the TCI state list of one CORESET. Similarly, the MAC signaling correspondingly activates the TCI states of one CORESET, does not activate only one TCI state but activates one or more TCI states. The number of TCI states activated by the MAC signaling is less than or equal to the number of frequency domain resources obtained by dividing or offsetting. For example, for each TRP/panel, the number of activated TCI states is 0 or 1. When the terminal receives the PDCCH on the CORESET, the terminal needs to use the receiving beams corresponding to all TCI states activated through MAC CE to receive the PDCCH.

In the embodiments of the disclosure, for ease of description, the RRC signaling for indicating the TCI state in the method of configuring one CORESET to realize the configuration of the plurality of different frequency domain resources may be called as first RRC signaling, the MAC signaling for activating the TCI state is called as first MAC signaling. The first RRC signaling is configured to indicate the TCI state list of the CORESET and the first MAC signaling is configured to activate one or more TCI states in the TCI state list.

In the embodiments of the disclosure, for different TRP/panels, in order to realize retransmission of the downlink control signaling on the PDCCH based on different frequency domain resources, a plurality of CORESETs can be configured and the plurality CORESETs correspond to different CORESET pool indexes. In other words, the plurality of different frequency domain resources for transmitting the same downlink control signaling on the plurality of beam directions are frequency domain resources corresponding to a plurality of CORESETs with different CORESET pool indexes and different frequency domain resources.

The plurality of CORESETs correspond to different frequency domain resources, but may have the same or different CORESET IDs. In order to ensure the transmission on the same time domain resource, the plurality of CORESETs have at least one same configuration parameter. The configuration parameter includes at least one of a number of time domain symbols, a cycle of a search space, a slot offset of the search space, a starting symbol position monitored in a slot of the search space. For example, the plurality of CORESETs correspond to the same number of time domain symbols. The plurality of CORESETs correspond to the search space with the same cycle and same slot offset. The plurality of CORESETs correspond to the same starting symbol position monitored in a slot of the search space.

In the embodiments of the disclosure, in the method of configuring multiple separate CORESETs to realize the configuration of the plurality of different frequency domain resources, the TCI states of the multiple CORESETs are configured separately, i.e., the RRC signaling indicates the TCI state list of each CORESET. The MAC signalings may separately activate the TCI states in different TCI state lists or the MAC signaling may jointly activate the TCI states in multiple TCI state lists. In the embodiments of the disclosure, for ease of description, the RRC signaling for indicating the TCI state in the method of configuring multiple separate CORESETs to realize the configuration of the plurality of different frequency domain resources may be called as second RRC signaling, the MAC signaling is called as second MAC signaling. The second RRC signaling is configured to indicate the TCI state list of the CORESET and the first MAC signaling is configured to activate one or more TCI states in the TCI state list. The number of the second RRC signalings is the same as the number of the configured CORESETs, the second RRC signalings are used to respectively indicate TCI state lists of the plurality of CORESETs with different CORESET pool indexes. The number of the second MAC signalings may be one or more. One or more second MAC signalings are used to activate the TCI states. The number of activated TCI states is less than or equal to the number of the frequency domain resources. In an example, there are two TRP/panels, TRP/panel #0 and TRP/panel #1. If a plurality of second MAC signalings are required, each second MAC signaling is used to activate the TCI state of one TRP/panel. In this case, the number of TCI states activated by each second MAC signaling is 0 or 1. In other words, for each TRP/panel, zero TCI state may be activated, i.e., no TCI state is activated, or one TCI state is activated. If one second MAC signaling is required, the second MAC signaling is used to activate the TCI states of the two TRP/panels. In this case, the number of TCI states activated by the second MAC signaling is 1 or 2. In other words, one TCI state of only one TRP/panel is activated, or one TCI state of each of the two TRP/panels is activated respectively.

It should be understood that, in the embodiments of the disclosure, when the second MAC signaling merely activates one TCI state, the data transmission is no longer retransmission of the same downlink control signaling through multiple TRP/panels, but fallbacks to transmission of the downlink control signaling through one TRP/panel.

In the embodiments of the disclosure, in the method of configuring the plurality of different frequency domain resources to realize the transmission of the same downlink control signaling on the plurality of beam directions, the plurality of beam directions correspond to the same or different cell identifications. In other words, the multiple TRP/panels may be intra-cell or inter-cell, to adapt to requirements of different communication scenarios. If the multiple TRP/panels are inter-cell, in the method of configuring the plurality of CORESETs, the CORESET pool indexes are different, or the CORESET pool indexes and/or the cell indexes corresponding to the CORESETs are different.

Further, in the embodiments of the disclosure, the network device may send first indication information to the terminal. The first indication information is configured to instruct the terminal to receive the same downlink control signaling of the plurality of beam directions simultaneously with the plurality of different frequency domain resources. The terminal receives the same downlink control signaling of the plurality of beam directions simultaneously with the plurality of different frequency domain resources after receiving the first indication information sent by the network device. The first indication information may be a RRC signaling and/or a MAC signaling. The RRC signaling and/or MAC signaling may include a cell index and/or a CORESET pool index and/or a CORESET ID. Through the first indication information, it may be determined to start the method for retransmission of the downlink control signaling.

Further, in the embodiments of the disclosure, when sending the same downlink control signaling using the same time domain resource on the plurality of beam directions with the plurality of different frequency domain resources, a slot position of the downlink control signaling is not limited. For example, the slot position of the downlink control signaling may be the starting symbol position of the slot, i.e., occupying symbols 0, 1 and 2. The slot position of the downlink control signaling may be a middle position of the slot, for example for scheduling of mini-slot.

In the embodiments of the disclosure, by designing a new method of configuring the CORESET, including the CORESET pool index in the RRC signaling, the RRC signaling related to configuration of the TCI state and the MAC signaling related to activation of the TCI state, the terminal may receive the same downlink control signaling sent on different frequency domain resources from multiple TRP/panels. The multiple TRP/panels may come from the same cell or different cells. With the disclosure, the retransmission of the downlink control signaling of the PDCCH can be realized on different frequency domain resources through different beam directions, so that the reliability and robustness of transmission of the downlink control signaling can be improved.

It should be understood that, the above embodiments of the method of repeatedly sending the same downlink control signaling using different frequency domain resources through multiple TRP/panels are also applicable to an interaction process between the terminal and the network device.

In the embodiments of the disclosure, a process of sending a same downlink control signaling on a plurality of beam directions with a plurality of transmission resources having the same time domain resource and the same frequency domain resource is illustrated below.

It should be understood that, in the embodiments of the disclosure, for ease of description, the time domain resource and the frequency domain resource are called as time-frequency resource for short. The same time-frequency resource represents the same time domain and same frequency domain resource. In the embodiments of the disclosure, the plurality of transmission resources having the same time domain resource and the same frequency domain resource may be called as a plurality of transmission resources having the same time-frequency resource. Those skilled in the art should appreciate the consistency of the meanings.

Figure 4:
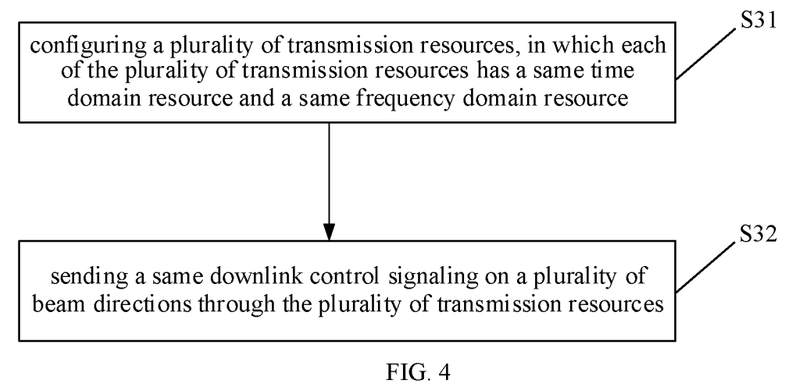
FIG. 4 is a flowchart illustrating a data transmission method according to an embodiment of the disclosure.

FIG. 4 is a flowchart illustrating a data transmission method according to an embodiment of the disclosure. As illustrated in FIG. 4, the data transmission method is applied in a network device and includes the following.

At block S31, a plurality of transmission resources are configured. Each of the plurality of transmission resources has a same time domain resource and a same frequency domain resource.

At block S32, a same downlink control signaling is sent on a plurality of beam directions with the plurality of transmission resources.

In the embodiments of the disclosure, the network device configures the plurality of transmission resources having the same time-frequency resource, and sends the same downlink control signaling on the plurality of beam directions with the plurality of transmission resources having the same time-frequency resource, so as to realize retransmission of the downlink control signaling through multiple TRP/panels, thus improving a reliability of transmission of the downlink control signaling.

Figure 5:
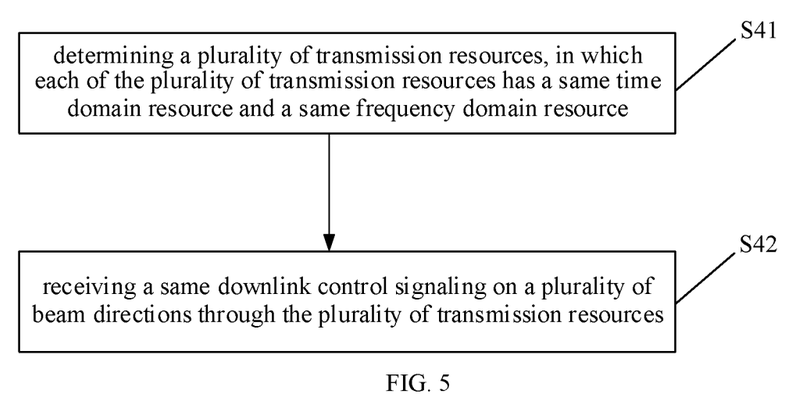
FIG. 5 is a flowchart illustrating a data transmission method according to an embodiment of the disclosure.

FIG. 5 is a flowchart illustrating a data transmission method according to an embodiment of the disclosure. As illustrated in FIG. 5, the data transmission method is applied in a terminal and includes the following.

At block S41, a plurality of transmission resources are determined. Each of the plurality of transmission resources has a same time domain resource and a same frequency domain resource.

At block S42, a same downlink control signaling is received on a plurality of beam directions with the plurality of transmission resources.

In the embodiments of the disclosure, the terminal determines the plurality of transmission resources having the same time-frequency resource configured by the network device for the terminal, and receives the same downlink control signaling on the plurality of beam directions with the plurality of transmission resources having the same time-frequency resource, so as to realize retransmission of the downlink control signaling through multiple TRP/panels, thus improving a reliability of transmission of the downlink control signaling.

In the embodiments of the disclosure, the network device sending the same downlink control signaling on the plurality of beam directions with the plurality of transmission resources having the same time-frequency resource may be understood as multiple TRP/panels sending the same downlink control signaling using different beam directions on the same time-frequency resource to the same terminal. The multiple TRP/panels use different transmitting beams. The terminal uses different receiving beams to receive the same downlink control signaling on the plurality of beam directions with the plurality of transmission resources having the same time-frequency resource, that is, the terminal uses the receiving beams corresponding to multiple TCI states to receive the same downlink control signaling sent on the PDCCH from the multiple TRP/panels.

In the embodiments of the disclosure, for different TRP/panels, in order to realize retransmission of the downlink control signaling based on the plurality of transmission resources having the same time-frequency source, a plurality of CORESETs having the same time-frequency resource can be configured, the plurality of CORESETs correspond to different CORESET pool indexes. In other words, the plurality of transmission resources having the same time-frequency resource for transmitting the same downlink control signaling on the plurality of beam directions are time-frequency resources corresponding to the plurality of CORESETs having the same time-frequency resource and different CORESET pool indexes.

The plurality of CORESETs having the same time-frequency resource may correspond to the same or different CORESET IDs.

In the embodiments of the disclosure, the plurality of CORESETs having the same time-frequency resource and different CORESET pool indexes can be considered as multiple separate CORESETs, and TCI states are configured separately. In other words, the RRC signalings configure the TCI state lists of the CORESETs, respectively. The MAC singling activates one TCI state. In the embodiments of the disclosure, for ease of description, the RRC signaling for indicating the TCI state in the method of configuring the plurality of separate CORESETs to realize configuration of the plurality of transmission resources having the same time-frequency resource is called as third RRC singling, and the MAC singling is called as third MAC signaling. The third RRC signaling is configured to indicate the TCI state list of one CORESET. The third MAC signalings are configured to indicate activated TCI states in the TCI state lists indicated by the third RRC signaling, respectively, or the third MAC signaling is configured to jointly indicate activated TCI states in the TCI state lists indicated by the third RRC signaling.

In the embodiments of the disclosure, when the third MAC signalings indicate activated TCI states in the TCI state lists indicated by the third RRC signaling, respectively, the number of TCI states activated by each third MAC signaling is less than or equal to one. When the third MAC signaling jointly indicates activated TCI states in the TCI state lists indicated by multiple third RRC signalings, the number of TCI states activated by each third MAC signaling is less than or equal to the number of the configured CORESETs.

In an example, since the same-frequency resource is used, the terminal may not distinguish which CORESET pool index corresponds to the TRP/panel sending the downlink control signaling. For the CORESET with any CORESET pool index, as long as one TCI state is activated through the MAC signaling, the terminal needs to use the TCI state to receive the downlink control signaling sent on the time-frequency resource of the CORESET. If the third MAC signalings respectively activate the TCI states or the third MAC signaling jointly activates the TCI states for the CORESETs with multiple CORESET pool indexes, the terminal needs to use the corresponding TCI state to receive the downlink control signaling sent on the time-frequency resource of the CORESET for each of the CORESETs with multiple CORESET pool indexes.

If the third MAC signaling does not activate any TCI state or the TCI state activated by the MAC signaling is null for a CORESET with a certain CORESET pool index, the terminal may not receive the downlink control signaling for the CORESET with the certain CORESET pool index. In this case, the terminal may not to receive the downlink control signaling on the PDCCH from a certain TRP/panel.

In the embodiments of the disclosure, for different TRP/panels, in order to realize repeatedly receiving or sending the downlink control signaling based on the plurality of transmission resources having the same time-frequency source, one CORESET can be configured, the CORESET pool index of the CORESET is distinguished from the CORESET pool index used in the traditional method. The CORESET pool index used in the traditional method may be assigned value 0 or 1. Different values of the CORESET pool index correspond to different TRP/panels. In the embodiments of the disclosure, one CORESET pool index of one configured CORESET is configured to correspond to indicate that the CORESET can correspond to multiple different TRP/panels. In the embodiments of the disclosure, a new CORESET pool index is configured for the CORESET. The new CORESET pool index represents that the CORESET can be configured with a plurality of beam directions. That is, the CORESET indicated by the new CORESET pool index can correspond to multiple TRP/panels. The value of the new CORESET pool index may be a value other than 0 and 1, for example, 2 or 3.

For different TRP/panels, if one CORESET is configured to realize retransmission of the same downlink control signaling based on the plurality of transmission resources having the same time-frequency resource, since one CORESET corresponds to multiple TRP/panels, when the TCI states are configured, the RRC signaling can jointly configure the TCI states, i.e., one RRC signaling correspondingly configures the TCI state list of one CORESET. Similarly, the MAC signaling correspondingly activates the TCI state of one CORESET, does not activate only one TCI state but activates one or more TCI states, for example activating zero or one TCI state for each TRP/panel. When the terminal receives the PDCCH on the CORESET, the terminal needs to use the receiving beams corresponding to all the TCI states activated by the MAC signaling to receive the downlink control signaling on the PDCCH. In the embodiments of the disclosure, the RRC signaling for configuring the TCI state in the method of configuring one CORESET to realize the retransmission of the same downlink control signaling based on the plurality of transmission resources having the same time-frequency resource may be called as fourth RRC signaling, the MAC signaling is called as fourth MAC signaling. The fourth RRC signaling is configured to indicate the TCI state list of the CORESET and the fourth MAC signaling is configured to activate one or more TCI states in the TCI state list.

In the embodiments of the disclosure, if the fourth MAC signaling activates multiple TCI states, the terminal uses the multiple TCI states to receive the downlink control signaling on the PDCCH sent on the time-frequency resource of the CORESET.

In the embodiments of the disclosure, in the method of configuring the plurality of transmission resources having the same time-frequency resource to realize the retransmission of the same downlink control signaling, the plurality of beam directions correspond to the same or different cell identifications. In other words, the multiple TRP/panels may be intra-cell or inter-cell, to adapt to requirements of different communication scenarios. If the multiple TRP/panels are inter-cell, in the method of configuring the plurality of CORESETs, the CORESET pool indexes are different, or the CORESET pool indexes and/or the cell indexes corresponding to the CORESETs are different.

Further, in the embodiments of the disclosure, the network device may send second indication information to the terminal. The second indication information is configured to instruct the terminal to receive the same downlink control signaling of the plurality of beam directions with the plurality of transmission resources having the same time-frequency resource. The terminal receives the same downlink control signaling of the plurality of beam directions with the plurality of transmission resources having the same time-frequency resource after receiving the second indication information sent by the network device.

The second indication information may be a RRC signaling and/or a MAC signaling. The RRC signaling and/or MAC signaling may include a cell index and/or a CORESET pool index and/or a CORESET ID. Through the second indication information, it may be determined to start the method for retransmission of the downlink control signaling.

Further, in the embodiments of the disclosure, when sending the same downlink control signaling using the same time domain resource on the plurality of beam directions with the plurality of different frequency domain resources, a slot position of the downlink control signaling is not limited. For example, the slot position of the downlink control signaling may be the starting symbol position of the slot, i.e., occupying symbols 0, 1 and 2. The slot position of the downlink control signaling may be a middle position of the slot, for example for scheduling of mini-slot.

In the embodiments of the disclosure, by designing a new method of configuring the CORESET, including the CORESET pool index in the RRC signaling, the RRC signaling related to configuration of the TCI state and the MAC signaling related to activation of the TCI state, the terminal may receive the same downlink control signaling sent on the same time-frequency resource from multiple TRP/panels. The multiple TRP/panels may come from the same cell (with the same cell identification) or different cells (with different cell identifications), to adapt to different communication scenarios. With the disclosure, the retransmission of the downlink control signaling of the PDCCH can be realized on the same time-frequency resource through different beam directions, so that the reliability and robustness of transmission of the downlink control signaling can be improved.

It should be understood that, the above embodiments of the method of repeatedly sending or receiving the same downlink control signaling using the same time-frequency resource through multiple TRP/panels are also applicable to an interaction process between the terminal and the network device.

Based on the same concept, the embodiments of the disclosure further provide a data transmission apparatus.

It can be understood that, in order to implement the above-mentioned functions, the data transmission apparatus provided by the embodiments of the present disclosure includes corresponding hardware structures and/or software modules for executing each function. Combining with the units and algorithm steps of each example disclosed in the embodiments of the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods for each specific application to implement the described functions, but such implementation should not be considered beyond the scope of the technical solutions of the embodiments of the present disclosure.

Figure 6:
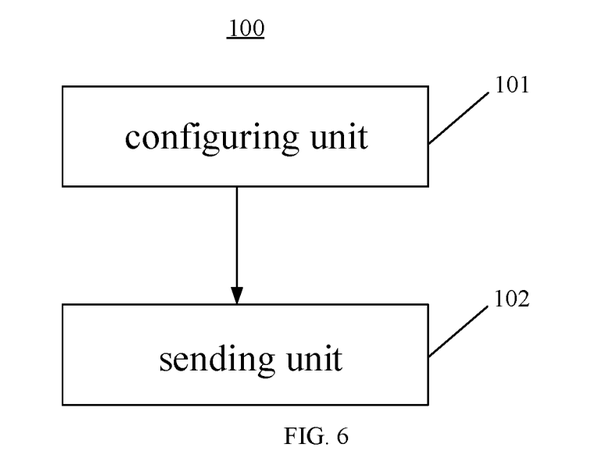
FIG. 6 is a block diagram illustrating a data transmission apparatus according to an embodiment of the disclosure.

FIG. 6 is a block diagram of a data transmission apparatus according to an embodiment. As illustrated in FIG. 6, the data transmission apparatus 100 is applied in a network device and includes a configuring unit 101 and a sending unit 102.

The configuring unit 101 is configured to configure a plurality of different frequency domain resources, and configure a same time domain resource for the plurality of different frequency domain resources. The sending unit 102 is configured to send a same downlink control signaling using the same time domain resource on a plurality of beam directions with the plurality of different frequency domain resources.

In an implementation, the plurality of different frequency domain resources include a plurality of different resource block sets obtained by dividing frequency domain resources corresponding to a same control resource set (CORESET).

In another implementation, resource blocks in the plurality of different resource block sets are continuous or discontinuous.

Each of the plurality of different resource block sets has the same number of RBs.

In another implementation, the plurality of different frequency domain resources have a specific offset with respect to frequency domain resources corresponding to a CORESET. That is, the plurality of different frequency domain resources are a plurality of frequency domain resources have the specific offset with respect to the frequency domain resources corresponding to the specific CORESET.

In another implementation, each of the plurality of frequency domain resources has the same number of RBs.

In another implementation, the configuring unit 101 is further configured to configure a first CORESET pool index for the CORESET, in which the first CORESET pool index indicates that a plurality of beam directions can be configured for the CORESET.

In another implementation, the sending unit 102 is further configured to indicate transmission configuration indication (TCI) states of the plurality of beam directions based on a first radio resource control (RRC) signaling and a first media access control (MAC) signaling. The first RRC signaling is configured to indicate a TCI state list of the CORESET, and the first MAC signaling is configured to activate one or more TCI states in the TCI state list.

In another implementation, the plurality of different frequency domain resources are a plurality of CORESETs with different second CORESET pool indexes and different frequency domain resources.

In another implementation, the plurality of CORESETs with different second CORESET pool indexes have at least one same configuration parameter, the configuration parameter includes at least one of a number of time domain symbols, a cycle of a search space, a slot offset of the search space, a starting symbol position monitored in a slot of the search space. For example, the CORSET IDs of the plurality of CORESETs may be the same or different. The plurality of CORESETs may have the same number of time domain symbols. The plurality of CORESETs may have the search space with the same cycle and the same slot offset. The plurality of CORESETs may have the same starting symbol position monitored in the slot of the search space.

In another implementation, the sending unit 102 is further configured to indicate TCI states of the plurality of beam directions based on a plurality of second RRC signalings and one or more second MAC signalings. The plurality of second RRC signalings are configured to respectively indicate TCI state lists of different CORESETs with different CORESET pool indexes. The one or more second MAC signalings are configured to activate TCI states, in which the number of activated TCI states is less than or equal to the number of the frequency domain resources.

In another implementation, the sending unit 102 is further configured to send first indication information to a terminal, in which the first indication information is configured to instruct the terminal to receive the same downlink control signaling of the plurality of beam directions on the same time domain resource with the plurality of different frequency domain resources.

In another implementation, the plurality of beam directions correspond to a same cell identification or different cell identifications.

Figure 7:
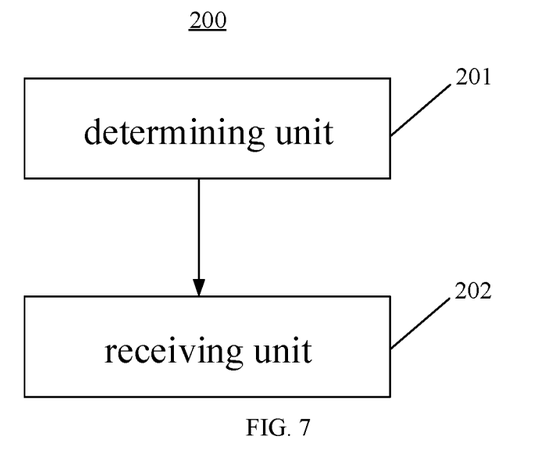
FIG. 7 is a block diagram illustrating a data transmission apparatus according to an embodiment of the disclosure.

FIG. 7 is a block diagram of a data transmission apparatus according to an embodiment. As illustrated in FIG. 7, the data transmission apparatus 200 is applied in a terminal and includes a determining unit 201 and a receiving unit 102.

The determining unit 201 is configured to determine a plurality of different frequency domain resources and a same time domain resource configured for the plurality of different frequency domain resources. The receiving unit 102 is configured to receive a same downlink control signaling using the same time domain resource on a plurality of beam directions with the plurality of different frequency domain resources.

In an implementation, the plurality of different frequency domain resources include a plurality of different resource block sets obtained by dividing frequency domain resources corresponding to a same control resource set (CORESET).

In another implementation, resource blocks in the plurality of different resource block sets are continuous or discontinuous.

Each of the plurality of different resource block sets has the same number of RBs.

In another implementation, the plurality of different frequency domain resources have a specific offset with respect to frequency domain resources corresponding to a specific CORESET. That is, the plurality of different frequency domain have the specific offset with respect to the frequency domain resources corresponding to the CORESET.

In another implementation, each of the plurality of frequency domain resources has the same number of RBs.

In another implementation, the determining unit 201 is further configured to determine a first CORESET pool index for the CORESET, in which the first CORESET pool index indicates that a plurality of beam directions can be configured for the CORESET.

In another implementation, the receiving unit 202 is further configured to receive transmission configuration indication (TCI) states of the plurality of beam directions based on a first radio resource control (RRC) signaling and a first media access control (MAC) signaling. The first RRC signaling is configured to indicate a TCI state list of the CORESET, and the first MAC signaling is configured to activate one or more TCI states in the TCI state list.

In another implementation, the plurality of different frequency domain resources include a plurality of CORESETs with different second CORESET pool indexes and different frequency domain resources.

In another implementation, the plurality of CORESETs with different CORESET pool indexes have at least one same configuration parameter, the configuration parameter includes at least one of a number of time domain symbols, a cycle of a search space, a slot offset of the search space, a starting symbol position monitored in a slot of the search space. For example, the CORSET IDs of the plurality of CORESETs may be the same or different. The plurality of CORESETs may have the same number of time domain symbols. The plurality of CORESETs may have the search space with the same cycle and the same slot offset. The plurality of CORESETs may have the same starting symbol position monitored in the slot of the search space.

In another implementation, the receiving unit 202 is further configured to receive TCI states of the plurality of beam directions based on a plurality of second RRC signalings and one or more second MAC signalings. The plurality of second RRC signalings are configured to respectively indicate TCI state lists of different CORESETs with different CORESET pool indexes. The one or more second MAC signalings are configured to activate TCI states, in which the number of activated TCI states is less than or equal to the number of the frequency domain resources.

In another implementation, the receiving unit 202 is further configured to receive first indication information, in which the first indication information is configured to instruct the terminal to receive the same downlink control signaling of the plurality of beam directions on the same time domain resource with the plurality of different frequency domain resources.

In another implementation, the plurality of beam directions correspond to a same cell identification or different cell identifications.

Figure 8:
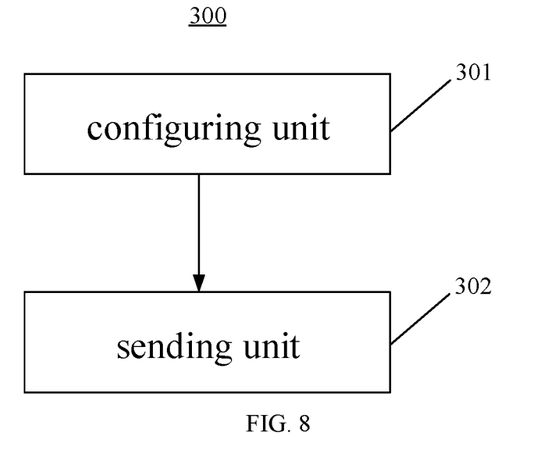
FIG. 8 is a block diagram illustrating a data transmission apparatus according to an embodiment of the disclosure.

FIG. 8 is a block diagram of a data transmission apparatus according to an embodiment. As illustrated in FIG. 8, the data transmission apparatus 300 is applied in a network device and includes a configuring unit 301 and a sending unit 302.

The configuring unit 301 is configured to configure a plurality of transmission resources, in which each of the plurality of transmission resources has a same time domain resource and a same frequency domain resource. The sending unit 302 is configured to send a same downlink control signaling on a plurality of beam directions with the plurality of transmission resources.

In an implementation, the plurality of transmission resources include time-frequency resources corresponding to a plurality of control resource sets (CORESETs) with different second CORESET pool indexes and the same time domain resource and the same frequency domain resource.

In another implementation, the sending unit 302 is configured to indicate transmission configuration indication (TCI) states respectively for the plurality of CORESETs.

In another implementation, the sending unit 302 is configured to indicate the TCI states respectively for the plurality of CORESETs by indicating a TCI state list of each of the plurality of CORESETs, respectively, based on a third radio resource control (RRC) signaling; and indicating an activated TCI state in each TCI state list indicated by the third RRC signaling, respectively, based on a third media access control (MAC) signaling.

In another implementation, a number of TCI states activated by the third MAC signaling is less than or equal to one.

In another implementation, the plurality of transmission resources include time domain resources and frequency domain sources corresponding to a same CORESET corresponding to the plurality of beam directions.

In another implementation, the sending unit 302 is further configured to indicate TCI states of the plurality of beam directions based on a fourth RRC signaling and a fourth MAC signaling. The fourth RRC signaling is configured to indicate a TCI state list of the CORESET, and the fourth MAC signaling is configured to activate one or more TCI states in the TCI state list.

In another implementation, the configuring unit 301 is further configured to configure a first CORESET pool index for the CORESET, in which the first CORESET pool index indicates that a plurality of beam directions can be configured for the CORESET.

In another implementation, the sending unit 302 is further configured to send second indication information to a terminal, in which the second indication information is configured to instruct the terminal to receive the same downlink control signaling of the plurality of beam directions with the plurality of transmission resources.

In another implementation, the plurality of beam directions correspond to a same cell identification or different cell identifications.

Figure 9:
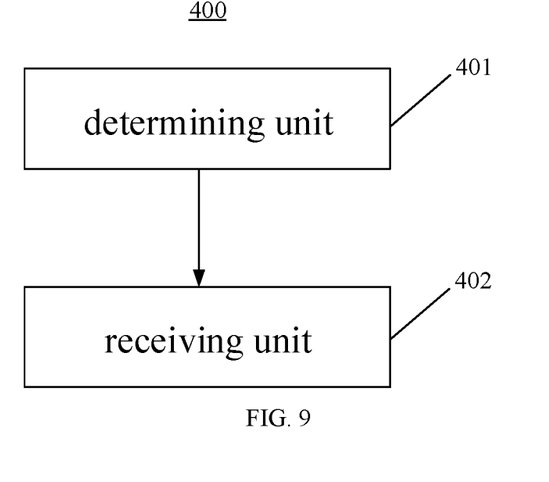
FIG. 9 is a block diagram illustrating a data transmission apparatus according to an embodiment of the disclosure.

FIG. 9 is a block diagram of a data transmission apparatus according to an embodiment. As illustrated in FIG. 9, the data transmission apparatus 400 is applied in a terminal and includes a determining unit 401 and a receiving unit 402.

The determining unit 401 is configured to determine a plurality of transmission resources, in which each of the plurality of transmission resources has a same time domain resource and a same frequency domain resource. The receiving unit 402 is configured to receive a same downlink control signaling on a plurality of beam directions with the plurality of transmission resources.

In an implementation, the plurality of transmission resources include time-frequency resources corresponding to a plurality of control resource sets (CORESETs) with different second CORESET pool indexes and the same time-frequency resource.

In another implementation, the receiving unit 402 is configured to receive transmission configuration indication (TCI) states indicated respectively for the plurality of CORESETs, and receive the same downlink control signaling on the plurality of beam directions based on the TCI states.

In another implementation, the receiving unit 402 is configured to receive the TCI states indicated respectively for the plurality of CORESETs by receiving a TCI state list of each of the plurality of CORESETs, respectively, based on a third radio resource control (RRC) signaling; and receiving an activated TCI state in each TCI state list indicated by the third RRC signaling, respectively, based on a third media access control (MAC) signaling.

In another implementation, the receiving unit 402 is configured to receive the same downlink control signaling on the plurality of beam directions based on the TCI states by determining not to receive the downlink control signaling on the beam direction corresponding to zero TCI state in response to the third MAC signaling activating zero TCI state; and determining to receive the downlink control signaling on the beam direction corresponding to one TCI state in response to the third MAC signaling activating one TCI state.

In another implementation, the plurality of transmission resources include time domain resources and frequency domain sources corresponding to a same CORESET corresponding to the plurality of beam directions.

In another implementation, the receiving unit 402 is further configured to receive TCI states of the plurality of beam directions based on a fourth RRC signaling and a fourth MAC signaling. The fourth RRC signaling is configured to indicate a TCI state list of the CORESET, and the fourth MAC signaling is configured to activate one or more TCI states in the TCI state list. The downlink control signaling is received on the beam direction corresponding to each TCI state in the one or more TCI states.

In another implementation, the determining unit 401 is further configured to determine a first CORESET pool index for the CORESET, in which the first CORESET pool index indicates that a plurality of beam directions can be configured for the CORESET.

In another implementation, the receiving unit 402 is further configured to receive second indication information, in which the second indication information is configured to instruct the terminal to receive the same downlink control signaling of the plurality of beam directions with the plurality of transmission resources.

In another implementation, the plurality of beam directions correspond to a same cell identification or different cell identifications.

Regarding the apparatus in the above embodiment, the specific manner in which each module performs operations has been described in detail in the embodiment of the method, and will not be described in detail here.

Figure 10:
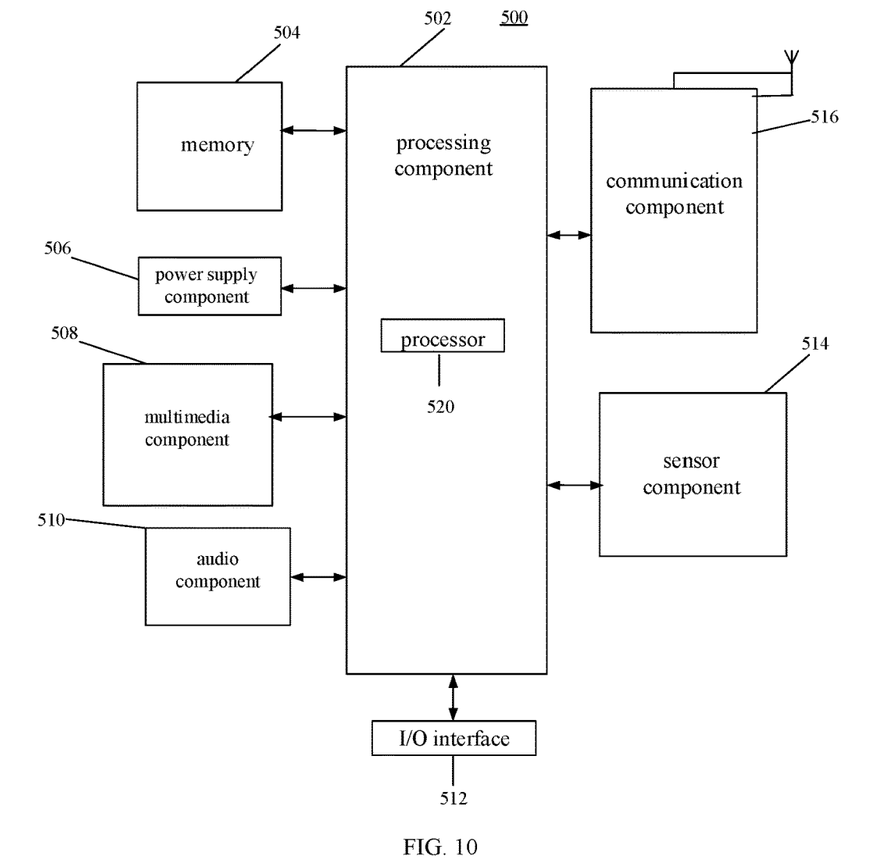
FIG. 10 is a block diagram illustrating a data transmission device according to an embodiment of the disclosure.

FIG. 10 is a block diagram illustrating a data transmission device 500 according to an embodiment of the disclosure. For example, the device 500 may be a mobile phone, a computer, a digital broadcasting UE, a messaging device, a game console, a tablet device, a medical equipment, a fitness equipment, a personal digital assistant, and so on.

Referring to FIG. 10, the device 500 may include one or more components of the followings: a processing component 502, a memory 504, a power supply component 506, a multimedia component 508, an audio component 510, an input/output (I/O) interface 512, a sensor component 514, and a communication component 516.

The processing component 502 generally controls the whole operation of the device 500, such as the operations related to display, phone call, data communication, camera operation and recording operation. The processing component 502 may include one or more processors 520 to perform instructions, to complete all or part of blocks of the above method. In addition, the processing component 502 may include one or more modules for the convenience of interaction between the processing component 502 and other components. For example, the processing component 502 may include a multimedia module for the convenience of interaction between the multimedia component 508 and the processing component 502.

The memory 504 is configured to store all types of data to support the operation of the device 500. Examples of the data include the instructions of any applications or methods operated on the device 500, contact data, phone book data, messages, pictures, videos, etc. The memory 504 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 506 may provide power for all components of the device 500. The power supply component 506 may include a power supply management system, one or more power supplies, and other units related to generating, managing and distributing power for the device 500.

The multimedia component 508 includes an output interface screen provided between the device 500 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 508 includes a front camera and/or a rear camera. When the device 500 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 510 is configured to output and/or input an audio signal. For example, the audio component 510 includes a microphone (MIC). When the device 500 is in an operation mode, such as a call mode, a record mode, and a speech recognition mode, the microphone is configured to receive the external audio signal. The received audio signal may be further stored in the memory 504 or sent via the communication component 516. In some embodiments, the audio component 510 further includes a speaker configured to output an audio signal.

The I/O interface 512 provides an interface for the processing component 502 and the peripheral interface module, and the peripheral interface module may be a keyboard, a click wheel, a button, etc. The button may include but not limited to a home button, a volume button, a start button and a lock button.

The sensor component 514 includes one or more sensors, configured to provide various aspects of status assessment for the device 500. For example, the sensor component 514 may detect the on/off state of the device 500 and the relative positioning of the component. For example, the component is a display and a keypad of the device 500. The sensor component 514 may further detect the location change of the device 500 or one component of the device 500, the presence or absence of contact between the user and the device 500, the orientation or acceleration/deceleration of the device 500, and the temperature change of the device 500. The sensor component 514 may include a proximity sensor configured to detect the existence of the objects nearby without any physical contact. The sensor component 514 may further include a light sensor such as a complementary metal oxide semiconductor (CMOS) or a charge-coupled device (CCD) image sensor, which is configured to use in imaging applications. In some embodiments, the sensor component 514 may further include an acceleration transducer, a gyroscope sensor, a magnetic sensor, a pressure sensor or a temperature sensor.

The communication component 516 is configured for the convenience of wire or wireless communication between the device 500 and other devices. The device 500 may access wireless networks based on communication standard, such as Wi-Fi, 2G or 3G, or their combination. In an embodiment, the communication component 516 receives broadcast signals or broadcast-related information from an external broadcast management system via a broadcast channel. In an embodiment, the communication component 516 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the device 500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 504 including executable instructions, the executable instructions may be executed by the processor 520 of the device 500 to complete the above methods. For example, the non-transitory computer-readable storage medium may be a ROM, a random access memory (RAM), a CD-ROM, a magnetic tape, a floppy disk, an optical data storage device, etc.

Figure 11:
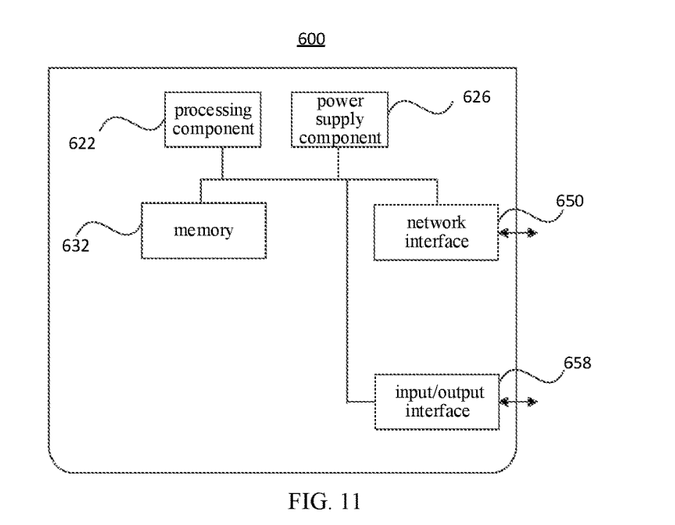
FIG. 11 is a block diagram illustrating a data transmission device according to an embodiment of the disclosure.

FIG. 11 is a block diagram illustrating a data transmission device 600 according to an embodiment. For example, the device 600 may be server. Referring to FIG. 11, the device 600 may include a processing component 622, which further includes one or more processors, and a memory resource represented by a memory 632, for storing instructions that may be executed by the processing component 622, such as an application program. The application program stored in the memory 632 may include one or more modules each corresponding to a set of instructions. In addition, the processing component 622 is configured to execute instructions to execute the aforementioned method.

The device 600 may also include a power supply component 626 configured to perform power management of the device 600, a wired or wireless network interface 650 configured to connect the device 600 to a network, and an input output (I/O) interface 658. The device 600 may operate based on an operating system stored in the memory 632, such as a Windows Server™, a Mac OS X™, a Unix™, a Linux™, a FreeBSD™ or the like.

It should be further understood that in the present disclosure, "plurality" refers to two or more, and other quantifiers are similar. "And/or", which describes the association relationship of the associated objects, means that there can be three kinds of relationships, for example, A and/or B, which can mean that A exists alone, A and B exist at the same time, and B exists alone. The character "/" generally indicates that the associated objects are an "or" relationship. The singular forms "a," "the," and "the" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, first information may also be referred to as second information, and similarly, second information may also be referred to as first information without departing from the scope of the present disclosure.

It is further to be understood that, although the operations in the embodiments of the present disclosure are described in a specific order in the drawings, it should not be construed as requiring that the operations be performed in the specific order shown or the serial order, or requiring Perform all operations shown to obtain the desired result. In certain circumstances, multitasking and parallel processing may be advantageous.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, the true scope and spirit of the disclosure being indicated by the following claims.

It should be understood that the disclosure is not limited to the precise structure described above and shown in the drawings, and various modifications and changes may be made without departing from its scope. The scope of the present disclosure is only limited by the appended claims.

The invention claimed is:

1. A data transmission method, comprising:
   configuring, by a network device, a plurality of different frequency domain resources, and configuring, by the network device, a same time domain resource for the plurality of different frequency domain resources; and
   sending, by the network device, a same downlink control signaling on a plurality of beams, using the same time domain resource with the plurality of different frequency domain resources;
   wherein the plurality of different frequency domain resources belong to a same control resource set (CORESET) or a plurality of CORESETs having different frequency domain resources,
   wherein the plurality of different frequency domain resources in the CORESET or the plurality of CORESETs comprise one or more same configuration parameters, and
   the configuration parameters comprise one or more of: a number of time domain symbols, a cycle of a search space, a slot offset of the search space, or a starting symbol position monitored in a slot of the search space;
   wherein, the plurality of different frequency domain resources comprise frequency domain resources corresponding to the plurality of CORESETs with different second CORESET pool indexes and different frequency domain resources;
   wherein the method further comprises:
   indicating, by the network device, TCI states of the plurality of beams based on a plurality of second radio resource control (RRC) signalings and one or more second MAC signalings;
   wherein, the plurality of second RRC signalings are configured to respectively indicate TCI state lists of the plurality of CORESETs with different second CORESET pool indexes; and
   the one or more second MAC signalings are configured to activate TCI states, wherein a number of activated TCI states is less than or equal to a number of the plurality of different frequency domain resources.

2. The method of claim 1, wherein, the plurality of different frequency domain resources comprise a plurality of different resource block sets obtained by dividing frequency domain resources corresponding to the CORESET.

3. The method of claim 1, wherein, the plurality of different frequency domain resources have a specific offset with respect to frequency domain resources corresponding to the CORESET.

4. The method of claim 2, further comprising:
   configuring, by the network device, a first CORESET pool index for the CORESET, wherein the first CORESET pool index indicates that the plurality of beams are capable of being configured for the CORESET.

5. The method of claim 4, further comprising:
   indicating, by the network device, transmission configuration indication (TCI) states of the plurality of beams based on a first radio resource control (RRC) signaling and a first media access control (MAC) signaling;
   wherein, the first RRC signaling is configured to indicate a TCI state list of the CORESET, and the first MAC signaling is configured to activate one or more TCI states in the TCI state list.

6. The method of claim 1, further comprising:
   sending, by the network device, first indication information to a terminal, wherein the first indication information is configured to instruct the terminal to receive the same downlink control signaling on the plurality of beams using the same time domain resource with the plurality of different frequency domain resources.

7. A data transmission method, comprising:
   determining, by a terminal, a plurality of different frequency domain resources and a same time domain resource configured for the plurality of different frequency domain resources; and
   receiving, by the terminal, a same downlink control signaling on a plurality of beams, using the same time domain resource with the plurality of different frequency domain resources;
   wherein the plurality of different frequency domain resources belong to a same control resource set (CORESET) or a plurality of CORESETs having different frequency domain resources,
   wherein the plurality of different frequency domain resources in the CORESET or the plurality of CORESETs comprise one or more same configuration parameters, and the configuration parameters comprise one or more of: a number of time domain symbols, a cycle of a search space, a slot offset of the search space, or a starting symbol position monitored in a slot of the search space;

wherein, the plurality of different frequency domain resources comprise frequency domain resources corresponding to the plurality of CORESETs with different second CORESET pool indexes and different frequency domain resources;

wherein the method further comprises:

indicating, by the network device, TCI states of the plurality of beams based on a plurality of second radio resource control (RRC) signalings and one or more second MAC signalings;

wherein, the plurality of second RRC signalings are configured to respectively indicate TCI state lists of the plurality of CORESETs with different second CORESET pool indexes; and the one or more second MAC signalings are configured to activate TCI states, wherein a number of activated TCI states is less than or equal to a number of the plurality of different frequency domain resources.

8. The method of claim 7, wherein, the plurality of different frequency domain resources comprise a plurality of different resource block sets obtained by dividing frequency domain resources corresponding to the CORESET.

9. The method of claim 7, wherein, the plurality of different frequency domain resources comprise a specific offset with respect to frequency domain resources corresponding to the CORESET.

10. The method of claim 8, further comprising:
determining, by the terminal, a first CORESET pool index of the CORESET, wherein the first CORESET pool index indicates that the plurality of beams are capable of being configured for the CORESET.

11. The method of claim 8, further comprising:
receiving, by the terminal, transmission configuration indication (TCI) states of the plurality of beams based on a first radio resource control (RRC) signaling and a first media access control (MAC) signaling;

wherein, the first RRC signaling is configured to indicate a TCI state list of the CORESET, and the first MAC signaling is configured to activate one or more TCI states in the TCI state list.

12. The method of claim 7, further comprising:
receiving, by the terminal, first indication information, wherein the first indication information is configured to instruct the terminal to receive the same downlink control signaling on the plurality of beams using the same time domain resource with the plurality of different frequency domain resources.

13. A data transmission device, comprising:
a processor; and
a memory configured to store instructions executable by the processor;
wherein the processor is configured to perform the data transmission method according to claim 7.

14. A data transmission device, comprising:
a processor; and
a memory configured to store instructions executable by the processor;
wherein the processor is configured to perform acts comprising:
configuring a plurality of different frequency domain resources and configuring a same time domain resource for the plurality of different frequency domain resources; and
sending a same downlink control signaling on a plurality of beams, using the same time domain resource with the plurality of different frequency domain resources;
wherein the plurality of different frequency domain resources belong to a same control resource set (CORESET) or a plurality of CORESETs having different frequency domain resources,
wherein the plurality of different frequency domain resources in the CORESET or the plurality of CORESETs comprise one or more same configuration parameters, and
the configuration parameters comprise one or more of: a number of time domain symbols, a cycle of a search space, a slot offset of the search space, or a starting symbol position monitored in a slot of the search space;
wherein, the plurality of different frequency domain resources comprise frequency domain resources corresponding to the plurality of CORESETs with different second CORESET pool indexes and different frequency domain resources;
wherein the processor is further configured to perform acts comprising:
indicating, by the network device, TCI states of the plurality of beams based on a plurality of second radio resource control (RRC) signalings and one or more second MAC signalings;
wherein, the plurality of second RRC signalings are configured to respectively indicate TCI state lists of the plurality of CORESETs with different second CORESET pool indexes; and
the one or more second MAC signalings are configured to activate TCI states, wherein a number of activated TCI states is less than or equal to a number of the plurality of different frequency domain resources.

* * * * *